United States Patent
Bogenrieder et al.

(10) Patent No.: US 8,870,220 B2
(45) Date of Patent: Oct. 28, 2014

(54) RESTRAINING SYSTEM, IN PARTICULAR FOR A MOTOR VEHICLE

(75) Inventors: Ralf Bogenrieder, Stuttgart (DE); Christian Burczyk, Stuttgart (DE); Andreas Hirth, Dielheim (DE); Lutz Quarg, Boeblingen (DE); Friedrich Reiter, Sindelfingen (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 13/702,847

(22) PCT Filed: Mar. 22, 2011

(86) PCT No.: PCT/EP2011/001405
§ 371 (c)(1),
(2), (4) Date: Dec. 7, 2012

(87) PCT Pub. No.: WO2011/154064
PCT Pub. Date: Dec. 15, 2011

(65) Prior Publication Data
US 2013/0087998 A1   Apr. 11, 2013

(30) Foreign Application Priority Data
Jun. 10, 2010   (DE) .......................... 10 2010 023 370

(51) Int. Cl.
*B60R 21/26* (2011.01)

(52) U.S. Cl.
USPC ........................................................ 280/736

(58) Field of Classification Search
USPC .................... 280/736, 740, 741, 742, 738
See application file for complete search history.

(56) References Cited

U.S. PATENT DOCUMENTS

| | | | | |
|---|---|---|---|---|
| 6,991,258 B2 * | 1/2006 | Hawthorn et al. | | 280/742 |
| 7,494,151 B2 * | 2/2009 | Maripudi | | 280/739 |
| 7,566,074 B2 * | 7/2009 | Hawthorn et al. | | 280/742 |
| 7,584,987 B2 * | 9/2009 | Choi | | 280/728.2 |
| 7,731,231 B2 * | 6/2010 | Schneider et al. | | 280/739 |
| 7,770,922 B2 * | 8/2010 | Schneider et al. | | 280/739 |
| 8,186,714 B2 * | 5/2012 | Schneider | | 280/739 |
| 8,191,926 B2 * | 6/2012 | Schneider | | 280/739 |
| 8,226,116 B2 * | 7/2012 | Yoo | | 280/739 |
| 2008/0252052 A1 * | 10/2008 | Schneider et al. | | 280/736 |
| 2010/0230941 A1 | 9/2010 | Hirth et al. | | |
| 2011/0049846 A1 | 3/2011 | Hirth et al. | | |
| 2011/0248487 A1 | 10/2011 | Burczyk et al. | | |

FOREIGN PATENT DOCUMENTS

| | | |
|---|---|---|
| DE | 10 2007 022 925 A1 | 11/2008 |
| DE | 10 2007 052 246 A1 | 5/2009 |
| DE | 10 2008 057 376 A1 | 5/2010 |

OTHER PUBLICATIONS

Corresponding International Search Report with English Translation dated Jun. 29, 2011 (four (4) pages).
German-language Written Opinion dated Jun. 29, 2011(PCT/ISA/237) (six (6) pages).

* cited by examiner

*Primary Examiner* — Faye M. Fleming
(74) *Attorney, Agent, or Firm* — Crowell & Moring LLP

(57) ABSTRACT

A restraint system for a motor vehicle includes a support structure moveable from a stowage position into a restraint position, a covering by means of which a restraint volume formed by the support structure in its restraint position is enclosed, and at least one ventilation opening via which a medium, in particular air, can flow into the covering during the transfer into the restraint position. The at least one ventilation opening is provided within a housing that at least partially accommodates the support structure and the covering in the stowage position.

20 Claims, 1 Drawing Sheet

RESTRAINING SYSTEM, IN PARTICULAR FOR A MOTOR VEHICLE

BACKGROUND AND SUMMARY OF THE INVENTION

Figure 1:
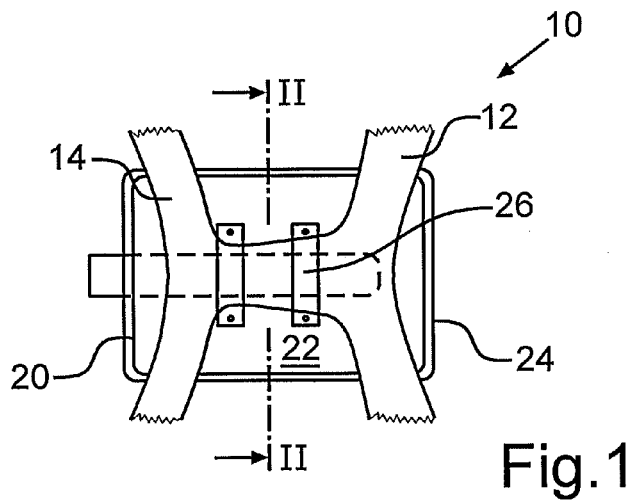

The invention relates to a restraint system, in particular for a motor vehicle.

German Patent documents DE 10 2007 052 246 A1 and DE 10 2007 022 925 A1 disclose restraint systems in the form or airbags that comprise a support structure that can be moved from a stowage position into a restraint position. This support structure is formed from a plurality of flexible tubular elements which, when triggered in an accident, are filled with a medium and thereby unfolded or enlarged. A covering arranged outside or inside the support structure or that fills individual partitions between the individual tubular elements of the support structure is unfolded together with the support structure as the latter is transferred from the stowage position into the restraint position and surrounds a restraint volume. In order to ensure that the covering can unfold quickly and that no partial vacuum is generated within the restraint volume, at least one ventilation opening is provided within the covering, via which opening a medium, such as ambient air, can enter the covering during the movement into the restraint position. As soon as the restraint system is in its restraint position, a person hitting the system is essentially accommodated by the corresponding displacement of the medium, in particular the ambient air, within the restraint volume.

A particularly important aspect of such restraint systems is—as explained above—that the respective medium, in particular the ambient air, has to be able to flow into the covering very fast, so that the formation of a partial vacuum within the covering is preferably prevented.

Exemplary embodiments of the present invention are directed to a restraint system in which the restraint volume bounded by the covering can be supplied with a medium, in particular ambient air, particularly well while the restraint system moves from the stowage position into the restraint position.

In accordance with exemplary embodiments of the present invention at the least one ventilation opening is provided within a housing that at least partially accommodates the support structure and the covering in the stowage position. In other words: at least one and preferably a plurality of ventilation openings is/are provided in the housing accommodating the covering and the support structure. It has been found that such ventilation openings can be integrated into the housing of the restraint system particularly easily in order to prevent any significant partial vacuum when generating the restraint volume provided by the covering, thereby ensuring a fast erection of the restraint system or airbag.

It is further advantageous if the covering is open in the region of the housing, sections of the housing forming the covering. As the covering is open in the region of the housing, the medium, in particular the ambient air, can flow via the housing into the covering or the restraint system respectively in a simple way.

Alternatively, the covering can be closed in the region of the housing and as a consequence has at least one ventilation opening that corresponds to one or more ventilation openings within the housing of the restraint system. Although ventilation openings are now required both within the housing and within the covering, the flow into the covering or the restraint system respectively can in this way be controlled particularly well.

BRIEF DESCRIPTION OF THE DRAWING FIGURES

Figures 2A, 2B:
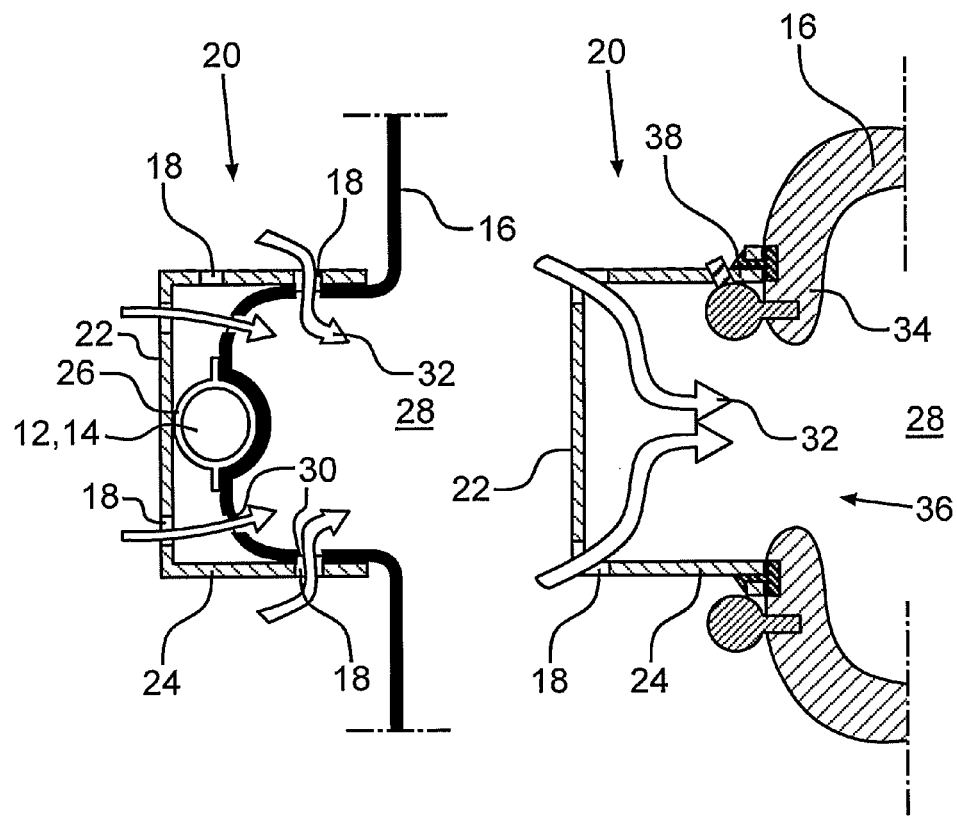

Further advantages, features and details of the invention can be derived from the following description of preferred embodiments and from the drawings, of which:

FIG. 1 shows a section of a front view of a housing of a restraint system for a motor vehicle, within which a support structure and a covering can be at least partially accommodated, the support structure and the covering being shown in a restraint position into which the restraint system can be moved from a stowage position if triggered in an accident, the housing comprising at least one ventilation opening via which a restraint volume bounded by the covering can be supplied with a medium, in particular ambient air, as the system is transferred from the stowage position into the restraint position;

FIG. 2a is a diagrammatic sectional view of the restraint system with the housing, the support structure and the cover along line II-II in FIG. 1, the support structure and the cover being shown while moving into the restraint position; and FIG. 2b is a diagrammatic sectional view of the restraint system similar to FIG. 2a along line II-II in FIG. 1, wherein, in contrast to the embodiment shown in FIG. 2a, the covering is open in the region of the housing, so that sections of the housing form the covering of the restraint system.

DETAILED DESCRIPTION

Of a restraint system in the form of an airbag, FIG. 1 only shows a highly diagrammatic front view. In principle, this restraint system is designed similar to the one described in German Patent Document DE 10 2007 052 246 A1, the disclosure content of which should therefore be considered as explicitly included (the disclosure of the corresponding U.S. patent application Publication 2011/049846 is herein expressly incorporated by reference). According to this, the present restraint system comprises a support structure 10 represented by a plurality of channel-shaped or tubular hollow bodies 12, 14 that are connected to one another in a manner to be described below. As disclosed in German Patent Document DE 10 2007 052 246 A1, this support structure 10 can be transferred from a stowage position into a restraint position on being triggered, for example in response to an imminent or actual collision of the motor vehicle. In the present case, the movement of the support structure 10 is caused by the fact that the hollow bodies 12, 14 of the support structure, which are connected to one another, are filled with a gaseous medium by pyrotechnical means. As a result, the support structure 10 unfolds into the restraint position, in which the support structure 10 substantially adopts the shape of a grid structure.

In addition to the support structure 10, the restraint system comprises a covering 16 that surrounds a restraint volume formed by the support structure 10 in its restraint position. The covering 16 can be secured to the outside or to the inside of the support structure 10, or it may fill individual partitions of the truss-like support structure 10. In any case, when the support structure 10 is transferred into its restraint position, the covering 16 bounds a restraint volume that catches the occupant of the seat. In this process, the inertia of the medium, in particular the ambient air, enclosed by the covering 18 of the restraint volume is utilized.

Suitable ventilation openings are therefore required through which the air of the restraint volume can flow into the covering 16 while the support structure 10 or the covering 16 is transferred into the restraint position.

In the present case—as will be explained in greater detail with reference to FIGS. 2a and 2b—this involves a plurality of ventilation openings 18 which are provided within a housing 20 of the restraint system.

FIGS. 2a and 2b are diagrammatic sectional view of the restraint system along the sectional plane represented by line II-II in FIG. 1.

FIG. 2a shows that the housing 20 is designed substantially rectangular and box-shaped—and open towards the covering 18. The housing 20 comprises a housing base 22 and side walls 24, which are designed in one piece. The plurality of ventilation openings 18 are provided in the housing base. In the illustrated embodiment, such ventilation openings 18 are provided in the region of the side walls 24 as well.

Also visible is a fastening element 26 for the support structure 10, and in the region of this fastening element 26, which for example surrounds one of the hollow bodies 12, 14 in the manner of a clamp, a gas generator may be provided for moving the support structure 10 from the stowage position into the restraint position.

FIG. 2 further shows that the covering 16 is secured to this fastening element 26 as well. In the illustrated embodiment, this covering 16 is closed in the region of the housing 22, being continuous. In order to enable a suitable medium, in the present case ambient air, to flow into a restraint volume 28 bounded or surrounded by the covering 16 when the restraint system is moved from the stowage position into the restraint position, a plurality of ventilation openings 30 of the covering, which correspond to the ventilation openings 18 within the housing 22, are provided. If the restraint system is now activated and the support structure 10 with the covering 18 is moved from the stowage position into the restraint position, air is in the course of this movement drawn via the ventilation openings 18 and 30 respectively into the region of the restraint volume 28 of the covering 16. The ventilation openings 18, 30 are in particular designed such that no excessive partial vacuum is generated within the covering 16 in the region of the restraint volume 28. Arrow 32 diagrammatically indicates the entry of the medium represented by ambient air through the ventilation openings 18, 30.

The embodiment of the restraint system according to FIG. 2b differs from that according to FIG. 2a in particular by an open design of the covering 16 in the region of the housing 20, so that sections of the housing 20 form the covering 16. By its respective ends 34, which bound a housing opening 38 of the side walls 24 of the housing 20, it is secured to edges 38 of the side walls 24 of the housing 20. This design offers the advantage that there is no need for the ventilation openings 30 shown in FIG. 2a within the covering 16. Only the ventilation openings 18 within the housing 20 are required to allow a medium, in this case ambient air, to flow into the restraint volume 28 of the covering 16.

It should further be noted that the housing of the illustrated embodiment is designed such that it at least partially accommodates the support structure 10 and the covering 16 in the stowage position. A further advantage lies in the fact that the ventilation openings 18 of the housing are at least substantially located outside the overlapping region with a respective hollow body 12, 14 of the support structure 10.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A restraint system for a motor vehicle, comprising:
a support structure that is moveable from a stowage position into a restraint position;
a covering configured to enclose a restraint volume formed by the support structure in its restraint position is enclosed;
a housing configured to at least partially accommodate the support structure and the covering in the stowage position; and
at least one ventilation opening configured such that a medium can flow into the covering during the transfer into the restraint position via the at least one ventilation opening, wherein the at least one ventilation opening is provided within the housing, wherein the at least one ventilation opening is in a housing base of the housing.

2. The restraint system according to claim 1, wherein the covering is open in a region of the housing, and sections of the housing form the covering.

3. The restraint system according to claim 1, wherein the covering is closed in a region of the housing and the covering includes at least one ventilation opening corresponding to the at least one ventilation opening in the housing.

4. A restraint system for a motor vehicle, comprising:
a support structure that is moveable from a stowage position into a restraint position;
a covering configured to enclose a restraint volume formed by the support structure in its restraint position is enclosed;
a housing configured to at least partially accommodate the support structure and the covering in the stowage position; and
at least one ventilation opening configured such that a medium can flow into the covering during the transfer into the restraint position via the at least one ventilation opening, wherein the at least one ventilation opening is provided within the housing,
wherein the at least one ventilation opening is at least substantially located outside an overlapping region with a hollow body of the support structure.

5. A restraint system for a motor vehicle, comprising:
a support structure that is moveable from a stowage position into a restraint position;
a covering configured to enclose a restraint volume formed by the support structure in its restraint position is enclosed;
a housing configured to at least partially accommodate the support structure and the covering in the stowage position; and
at least one ventilation opening configured such that a medium can flow into the covering during the transfer into the restraint position via the at least one ventilation opening, wherein the at least one ventilation opening is provided within the housing,
wherein the support structure comprises a plurality of channel-shaped or tubular hollow bodies connected to one another.

6. The restraint system according to claim 5, wherein the support structure is coupled to receive gas from a gas generator.

7. The restraint system according to claim 1, wherein the covering is secured to an outside of the support structure.

8. The restraint system according to claim 1, wherein the covering is secured to an inside of the support structure.

9. A restraint system for a motor vehicle, comprising:
a support structure that is moveable from a stowage position into a restraint position;

a covering configured to enclose a restraint volume formed by the support structure in its restraint position is enclosed;

a housing configured to at least partially accommodate the support structure and the covering in the stowage position; and at least one ventilation opening configured such that a medium can flow into the covering during the transfer into the restraint position via the at least one ventilation opening, wherein the at least one ventilation opening is provided within the housing, wherein the support structure is a truss-like support structure and the covering fills individual partitions of the truss-like support structure.

10. The restraint system according to claim 4, wherein the covering is open in a region of the housing, and sections of the housing form the covering.

11. The restraint system according to claim 4, wherein the support structure is coupled to receive gas from a gas generator.

12. The restraint system according to claim 4, wherein the covering is secured to an outside of the support structure.

13. The restraint system according to claim 5, wherein the covering is open in a region of the housing, and sections of the housing form the covering.

14. The restraint system according to claim 5, wherein the covering is secured to an outside of the support structure.

15. The restraint system according to claim 5, wherein the covering is secured to an inside of the support structure.

16. The restraint system according to claim 5, wherein the covering is closed in a region of the housing and the covering includes at least one ventilation opening corresponding to the at least one ventilation opening in the housing.

17. The restraint system according to claim 9, wherein the covering is open in a region of the housing, and sections of the housing form the covering.

18. The restraint system according to claim 9, wherein the covering is secured to an outside of the support structure.

19. The restraint system according to claim 9, wherein the covering is secured to an inside of the support structure.

20. The restraint system according to claim 9, wherein the covering is closed in a region of the housing and the covering includes at least one ventilation opening corresponding to the at least one ventilation opening in the housing.

\* \* \* \* \*